Z. B. BROWN.
Hand-Seeder.
No. 30,526.
Patented Oct. 30, 1860.
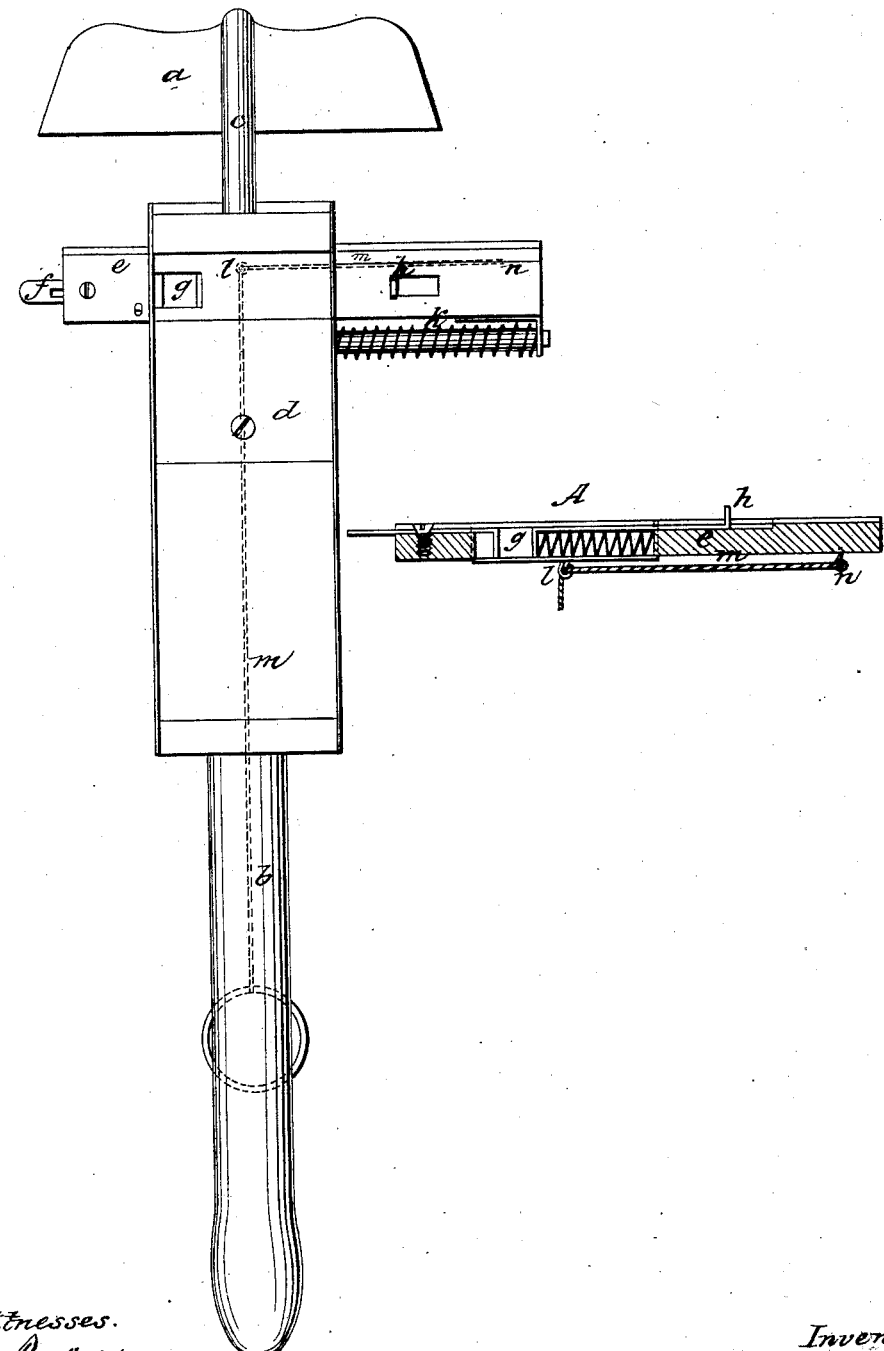
Witnesses.
C. Beckwith
Jenny W. Biys
Inventor:
Zerah B. Brown

UNITED STATES PATENT OFFICE.

ZERAH B. BROWN, OF SIMSBURY, CONNECTICUT.

IMPROVEMENT IN SEEDING-HOES.

Specification forming part of Letters Patent No. 30,526, dated October 30, 1860.

*To all whom it may concern:*

Be it known that I, Z. B. BROWN, of Simsbury, county of Hartford, and State of Connecticut, have invented certain new and useful Improvements in Seed-Planters; and I do hereby declare that the same is described and represented in the following specification and drawings.

To enable others skilled in the art to make and use the same, I will proceed to describe its construction and operation, referring to the drawings, in which the same letters indicate like parts in each of the figures.

In the accompanying drawings, $d$ is a box or receptacle for holding the seed, and is secured to the handle $b$ of the hoe in a proper manner by the use of screws or their equivalents. In the lower end of said box is arranged a device for adjusting and dealing out the seed from the seed-box $d$ in the desired quantity, a section of which is seen at A.

$e$ is a sliding bar, nearly in the center of which is fitted an elastic plate, $f$, one end of which is turned down through the aperture $g$, being of the same width (of the aperture) and even with the under side thereof, and forms one side of the said aperture $g$. On the other end of the said plate $f$ is formed a stop, $h$, which resists the action of the spring $k$ and keeps it (the plate $f$) in its place, except when the sliding bar $e$ is thrown forward to drop the seed. It (the stop $h$) strikes against the side of the box $d$ just as the aperture $g$, containing the seed, passes out of the box $d$, contracts the spring $k$, and enlarges the aperture $g$, so as to allow the seed to drop freely therefrom, which otherwise might be clogged and fail to drop.

$f$ is an adjustable slide fixed in the outer end of the bar $e$, its inner end being turned down and forming one side of the aperture $g$, by the use of which the amount of seed required to be dropped at a time is regulated.

$k$ is a spring used for the purpose of keeping the bar $e$ back with its aperture $g$ within the seed-box $d$.

I propose to use a wheel or angle-crank on the handle at $l$, so as to secure a free and easy action of the parts by means of a cord or wire connection, $m$, from the end of the bar $e$, at $n$, extending up the handle in a convenient manner to be operated by the hand while using the hoe.

In using this improvement the seed is placed in the box $d$. The hoe is used in the ordinary way to spot the ground for the seed. The cord or wire $m$ is pulled by the movement of the hand which moves forward the bar $e$, (having an aperture, $g$, so made as to adjust its size to the amount of seed required to be dropped at a time and in one place,) so as to bring the aperture $g$ just outside of the box, (the chamber or aperture $g$ by said movement being enlarged by the action of the elastic plate $f$,) allowing the seed freely and surely to drop in the required time, place, and quantity, and covered in the usual way. Thus it will be seen that a man having small grounds to cultivate can furnish himself with a planter combined with a hoe, that will do his work in a perfect and easy manner at a very small outlay, and which may be easily removed therefrom when not wanted for use.

I have thus endeavored to show the nature construction, and operation, and the advantage to be derived by my improvement.

I do not claim the device as employed in the registered application of J. S. Campbell, January 4, 1858, and that of J. Rogers, April 29, 1857; but

What I claim, and desire to secure by Letters Patent, is—

The seed-box $d$, hoe-handle $b$, and seed-slide $e$, the latter being provided with the adjustable plate $f$ and spring $k$, and arranged at right angles to said box and handle for operation conjointly in the manner and for the purpose described.

In testimony whereof I have hereunto set my hand and affixed my seal this 19th day of April, 1860.

ZERAH B. BROWN. [L. S.]

Witnesses:
C. BECKWITH,
JEREMY W. BLISS.